Dec. 9, 1952   J. M. PRITCHETT   2,620,533
BELT TIGHTENER
Filed Nov. 10, 1948
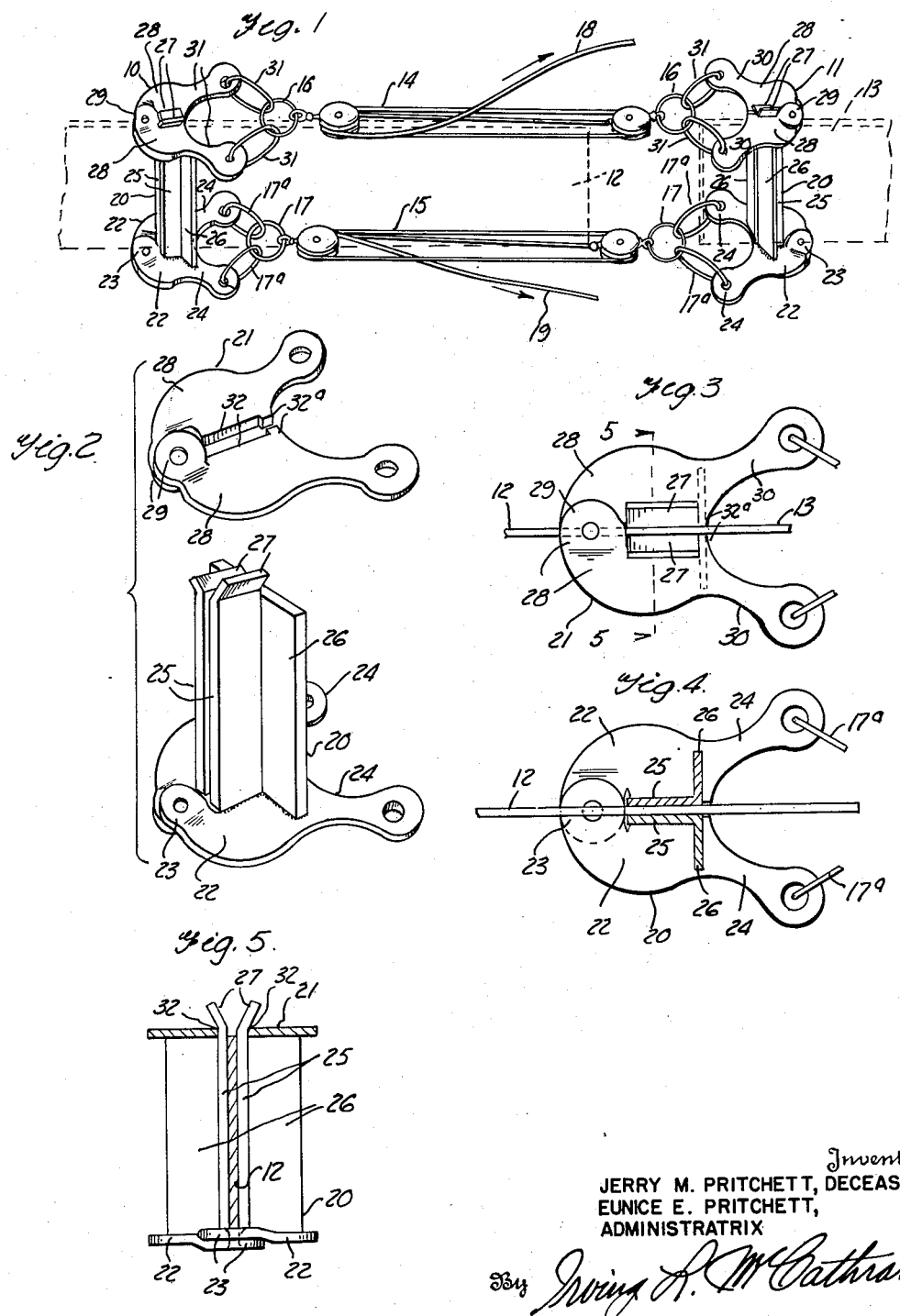
Inventor
JERRY M. PRITCHETT, DECEASED,
EUNICE E. PRITCHETT,
ADMINISTRATRIX
ATTY.

Patented Dec. 9, 1952

2,620,533

UNITED STATES PATENT OFFICE 2,620,533

BELT TIGHTENER

Jerry M. Pritchett, deceased, late of Glendale, Calif., by Eunice E. Pritchett, administratrix, Hollywood, Calif.

Application November 10, 1948, Serial No. 59,303

4 Claims. (Cl. 24—132)

This invention relates to belt tighteners, and has for one of its objects the production of a simple and efficient belt tightener having belt-gripping clamps which will firmly grip a belt near the ends thereof, in a manner whereby the ends of the belt may be easily drawn together and secured for tightening the belt.

A further object of this invention is the production of a simple and efficient block and tackle means for facilitating the drawing together of the belt gripping means and the respective ends of a belt for tightening.

Another object of this invention is the production of a simple and efficient belt engaging clamp for firmly gripping a belt through the medium of the pull which is exerted thereon.

Other objects and advantages of the present invention will appear throughout the following specification and claims.

In the drawing:

Figure 1 is a perspective view of the belt tightener;

Figure 2 is a group perspective view of one of the belt gripping clamps, showing the parts thereof separated;

Figure 3 is a top plan view of one of the clamps;

Figure 4 is a horizontal sectional view through one of the clamps; and

Figure 5 is a section taken on line 5—5 of Figure 3, the primary portion of the clamp being shown in end elevation.

By referring to the drawing, it will be seen that the belt tightener comprises the clamps 10 and 11 which are adapted to engage in gripping relation opposed belt ends 12 and 13 respectively, as shown in Figure 1. The clamps 10 and 11 are connected by the parallel block and tackle elements 14 and 15 of the conventional type through the connecting link assemblies 16 and 17. The block and tackle elements are of the type whereby a pull exerted upon the lines 18 and 19 will draw the clamps 10 and 11 toward each other to draw the belt ends 12 and 13 together for tightening.

Each clamp comprises a primary section 20 and a removable section 21. The primary section 20 comprises a pair of pivoted jaws 22, pivotally connected at their forward or outer ends 23 and having rearwardly extending laterally spreading arms 24. Each arm 24 is provided with an apertured outer end which is engaged by a link 17ª of the link assembly 17. The primary section 20 of each clamp carries a pair of belt engaging lips 25 having right angularly extending lateral reinforcing flanges 26. The lips 25 and flanges 26 preferably are welded to the inner face of the jaws 22 and are adapted to swing toward and away from each other as the arms 24 are swung to open and close the jaws 22. The lips 25 are carried by the pivoted jaws 22 in opposed relation in a manner to firmly grip a belt end therebetween as the arms 24 are swung toward each other as a pulling force is exerted upon the block and tackle elements 14 and 15 and link assemblies 17. The outer ends of the lips 25 are provided with oppositely flared angle flanges 27 which project beyond the outer ends of the flanges 26 as shown in Figures 2 and 5. It should be noted that the thickness of the lips 25 and flanges 27 may be varied to suit the type of work upon which the belt tightener is to be used.

The removable section 21 of each clamp comprises a pair of pivoted jaws 28 which are pivotally secured at their outer ends 29. The jaws 28 are provided with rearwardly extending laterally spreading arms 30 the ends of which are apertured to receive the pulling links 31 of the link assembly 16. The jaws 28 are provided with opposed lip engaging faces 32 which engage the lips 25 just below the angle flanges 27 and above the ends of the flanges 26 to prevent the removable section 21 from slipping off or out of engagement with the primary section 20 during the operation of the device. Lugs 32ª assist in holding the sections 20 and 21 in an assembled relation and may be employed or eliminated without departing from the spirit of the invention.

Due to the fact that the sections 20 and 21 of each clamp are separable, the belt tightener may be quickly and easily placed in engagement with the belt ends 12 and 13 by first placing the section 20 of each clamp in position and then connecting the detachable or removable section 21 to the primary section. The exertion of a pulling action upon the lines 18 and 19 will pull the jaws 22 of the primary section and the jaws 28 of the removable section together to draw the opposed lips 25 of the clamps to a vise-like gripping and biting action upon the respective belt ends thereby firmly securing the clamps in engagement with the belt ends. By a further pulling action upon the lines 18 and 19 the belt ends 12 and 13 may be drawn together for the purpose of tightening and fastening, and the harder the pull upon the lines 18 and 19, the tighter the clamps will grip the belt ends 12 and 13.

It should be understood that certain detail changes may be made in the device illustrated and described without departing from the spirit of Having described the invention, what is claimed as new is:

1. A belt gripping clamp for a belt tightening means comprising a primary section and a removable section, said primary section comprising a pair of pivoted jaws having rearwardly extending arms, opposed belt gripping lips extending at right angles to the arms and fixed to the arms, said removable section engaging said lips, and means engaging the arms of the primary section and said removable section for drawing the sections to belt gripping position.

2. A belt gripping clamp for a belt tightening means comprising a primary section and a removable section, said primary section comprising a pair of pivoted jaws having rearwardly extending arms, opposed belt gripping lips extending at right angles to the arms and fixed to the arms, said removable section comprising a pair of pivoted jaws having laterally and rearwardly extending arms, the last mentioned jaws having opposed lip engaging faces for engaging the lips to assist in drawing said lips to belt gripping engagement, and means for engaging the arms of the sections for drawing the jaws thereof to a gripping position.

3. A belt gripping clamp for a belt tightening means comprising a primary section and a removable section, said primary section comprising a pair of pivoted jaws having rearwardly extending arms, opposed belt gripping lips extending at right angles to the arms and fixed to the arms, said removable section comprising a pair of pivoted jaws having laterally and rearwardly extending arms, the last mentioned jaws having opposed lip engaging faces for engaging the lips to assist in drawing said lips to belt gripping engagement, means for engaging the arms of the sections for drawing the jaws thereof to a gripping position, the ends of said lips being laterally and oppositely flared, and the jaws of the removable section fitting behind said laterally and oppositely flared ends to hold the removable jaw against lateral displacement therefrom.

4. A belt gripping clamp for a belt tightening means comprising a primary section and a removable section, said primary section comprising a pair of pivoted jaws having rearwardly extending arms, said removable section comprising a pair of pivoted jaws having rearwardly extending arms, opposed belt gripping lips extending at right angles to the arms and fixed to the arms of said primary section, said removable section engaging said lips, means engaging the arms of the primary section and said removable section for drawing the sections to belt gripping position, and each opposed belt engaging lip being right angular in cross section.

EUNICE E. PRITCHETT.
*Administratrix of the Estate of Jerry M. Pritchett.*

REFERENCES CITED

The following references are of record in the file of this patent:

UNITED STATES PATENTS

| Number | Name | Date |
| --- | --- | --- |
| 492,972 | Seeley | Mar. 7, 1893 |
| 1,343,641 | Patterson | June 15, 1920 |
| 1,625,729 | Krum | Apr. 19, 1927 |
| 2,165,695 | Campbell | July 11, 1939 |